(12) United States Patent
Sato et al.

(10) Patent No.: US 10,738,716 B2
(45) Date of Patent: Aug. 11, 2020

(54) VALVE TIMING CONTROLLER

(71) Applicant: AISIN SEIKI KABUSHIKI KAISHA, Kariya-shi, Aichi-ken (JP)

(72) Inventors: Toshiki Sato, Takahama (JP); Yuji Kakuda, Nagoya (JP); Shogo Katsuki, Nagoya (JP); Yugo Kurahashi, Nagoya (JP)

(73) Assignee: AISIN SEIKI KABUSHIKI KAISHA, Kariya-Shi, Aichi-Ken (JP)

(*) Notice: Subject to any disclaimer, the term of this patent is extended or adjusted under 35 U.S.C. 154(b) by 0 days.

(21) Appl. No.: 16/448,602

(22) Filed: Jun. 21, 2019

(65) Prior Publication Data

US 2020/0011252 A1 Jan. 9, 2020

(30) Foreign Application Priority Data

Jul. 5, 2018 (JP) .................. 2018-128503

(51) Int. Cl.
*F01L 1/34* (2006.01)
*F02D 13/02* (2006.01)
*F01L 1/352* (2006.01)
*F16H 1/32* (2006.01)

(52) U.S. Cl.
CPC .......... *F02D 13/0234* (2013.01); *F01L 1/352* (2013.01); *F16H 1/32* (2013.01)

(58) Field of Classification Search
CPC ......... F02D 13/0234; F01L 1/352; F16H 1/32
See application file for complete search history.

(56) References Cited

U.S. PATENT DOCUMENTS

2005/0211207 A1 9/2005 Urushihata
2013/0080027 A1* 3/2013 Mikawa .............. F02D 13/0238
  701/102
2018/0340465 A1 11/2018 Mikawa

FOREIGN PATENT DOCUMENTS

JP  2004162706 A  6/2004
JP  2017008729 A  1/2017

* cited by examiner

*Primary Examiner* — Zelalem Eshete
(74) *Attorney, Agent, or Firm* — Buchanan Ingersoll & Rooney PC (57) ABSTRACT

A valve timing controller includes: a driving side rotation member that rotates synchronously with a crankshaft of an internal combustion engine; a driven side rotation member that integrally rotates with a cam shaft of the internal combustion engine; a phase regulating mechanism with which a relative rotation phase of the driving and driven side rotation members around a rotation axis is set by a driving force of an electric motor; a phase sensing portion that acquires the relative rotation phase; and a phase controlling section that controls the electric motor to set the relative rotation phase based on an acquisition result by the phase sensing portion. The phase sensing portion includes a cam angle sensor, a reference determination sensor, and a pattern storage unit. The valve timing controller further includes a phase acquisition portion.

2 Claims, 9 Drawing Sheets

VALVE TIMING CONTROLLER

CROSS REFERENCE TO RELATED APPLICATIONS

This application is based on and claims priority under 35 U.S.C. § 119 to Japanese Patent Application 2018-128503, filed on Jul. 5, 2018, the entire contents of which are incorporated herein by reference.

TECHNICAL FIELD

This disclosure relates to a valve timing controller which sets a relative rotation phase of a cam shaft for opening and closing a valve of an internal combustion engine.

BACKGROUND DISCUSSION

In JP 2004-162706A (Reference 1), as a valve timing controller having the above-described configuration, a technology in which a valve timing controller (variable valve timing device in Reference 1) is provided on an intake side cam shaft, and an actual valve timing is calculated based on a detection signal of a cam angle sensor that outputs a cam angle signal of the intake side cam shaft and a crank angle sensor that outputs a crank angle signal to a crankshaft, is described.

In Reference 1, a phase variable mechanism is configured to include an inner gear provided on the intake side cam shaft, an outer gear provided with the same axis as the inner gear, a planetary gear that meshes with the inner gear and the outer gear, and a motor for changing a revolving speed of the planetary gear. The phase variable mechanism can maintain the valve timing by matching a rotational speed of the motor with a rotational speed of the intake side cam shaft, and can set the valve timing to any of an advancing angle side and a retarding angle side by making the rotational speed of the motor faster or slower than the rotational speed of the intake side cam shaft.

Furthermore, in Reference 1, an amount of change in valve timing is calculated from a difference in rotational speed between the motor and the intake side cam shaft, and the final actual valve timing is calculated based on an amount of change between the actual valve timing and the valve timing.

In addition, as a valve timing controller having the above-described configuration, in JP 2017-8729A (Reference 2), a technology in which a valve timing controller (a variable valve timing mechanism in Reference 2) provided on an intake side cam shaft includes: a crank angle sensor that outputs a crank angle signal and a cam sensor that outputs a cam signal pulse corresponding to rotation of the intake cam shaft, and an actual rotation phase of the intake cam shaft is calculated based on a cam signal pulse detected first and a first reference position of the crank signal detected thereafter, after starting the cranking, is described.

In Reference 2, the cam sensor is configured to include a signal plate that rotates integrally with the intake cam shaft, and a rotation detection device that detects a plurality of protruding portions formed at an outer periphery of the signal plate. In this configuration, the entire periphery (region of 360 degrees) of the signal plate is equally divided into a plurality of regions, and different numbers of protruding portions are formed in parallel in a peripheral direction for each of the divided regions. In addition, one of the protruding portions is disposed at a boundary position of the divided regions. Therefore, when the intake cam shaft rotates, the rotation phase of the intake cam shaft is acquired by calculation based on the cam signal pulse when the rotation detection device first detects the protruding portion.

For example, considering the control when starting an internal combustion engine including the valve timing controller in the intake cam shaft, the cranking is started by the starter motor, the fuel is supplied to a combustion chamber after the rotational speed of the crankshaft rises to a value that enables the internal combustion engine to start, and an air-fuel mixture is ignited, but at the time of ignition, the opening and closing timing (valve timing) of the intake valve is set to a value appropriate for starting the starter motor.

In this manner, when the internal combustion engine is started, in order to set the opening and closing timing of the intake valve to a value appropriate for starting the internal combustion engine, it is necessary to acquire the actual opening and closing timing (actual valve timing) of the intake valve early.

However, since the final actual valve timing calculated by the processing described in Reference 1 can acquire the actual opening and closing timing (actual valve timing) of the intake valve in a situation where the internal combustion engine operates, the technology is inappropriate to acquire the opening and closing timing of the intake valve when starting the internal combustion engine.

Further, the technology described in Reference 2 can acquire the opening and closing timing of the valve when the internal combustion engine is started, but since the opening and closing timing of the valve is determined by acquiring the reference position of the crank angle signal after acquiring the first cam signal pulse, it takes time until acquiring the reference position from the crank angle signal after acquiring the cam signal pulse, and there is room for improvement.

Thus, a need exists for a valve timing controller which is not susceptible to the drawback mentioned above.

SUMMARY

A feature of a valve timing controller according to an aspect of this disclosure resides in that the valve timing controller includes: a driving side rotation member that rotates synchronously with a crankshaft of an internal combustion engine; a driven side rotation member that integrally rotates with a cam shaft for valve opening and closing of the internal combustion engine; a phase regulating mechanism with which a relative rotation phase of the driving side rotation member and the driven side rotation member around a rotation axis is set by a driving force of an electric motor; a phase sensing portion that acquires the relative rotation phase; and a phase controlling section that controls the electric motor to set the relative rotation phase based on an acquisition result by the phase sensing portion, in which the phase sensing portion includes a cam angle sensor that acquires a plurality of cam angle signals at different intervals when the cam shaft rotates one time, a reference determination sensor that acquires a reference signal at a specified rotation phase when the crankshaft rotates one time, and a pattern storage unit that stores signal patterns of the continuously acquired cam angle signals, and in which the valve timing controller further includes a phase acquisition portion that continuously acquires the cam angle signals at the time of cranking, specifies a pattern that matches the continuously acquired cam angle signals among the signal patterns stored in the pattern storage unit, and acquires the relative rotation phase based on a cam phase angle indicated by the specified signal pattern and a reference phase angle indicated by the reference signal.

BRIEF DESCRIPTION OF THE DRAWINGS

The foregoing and additional features and characteristics of this disclosure will become more apparent from the following detailed description considered with the reference to the accompanying drawings, wherein:

FIG. 10 is a timing chart illustrating a cam angle signal, a crank angle signal and the like.

DETAILED DESCRIPTION

Hereinafter, one embodiment disclosed here will be described based on the drawings.

Basic Configuration

Figure 1:
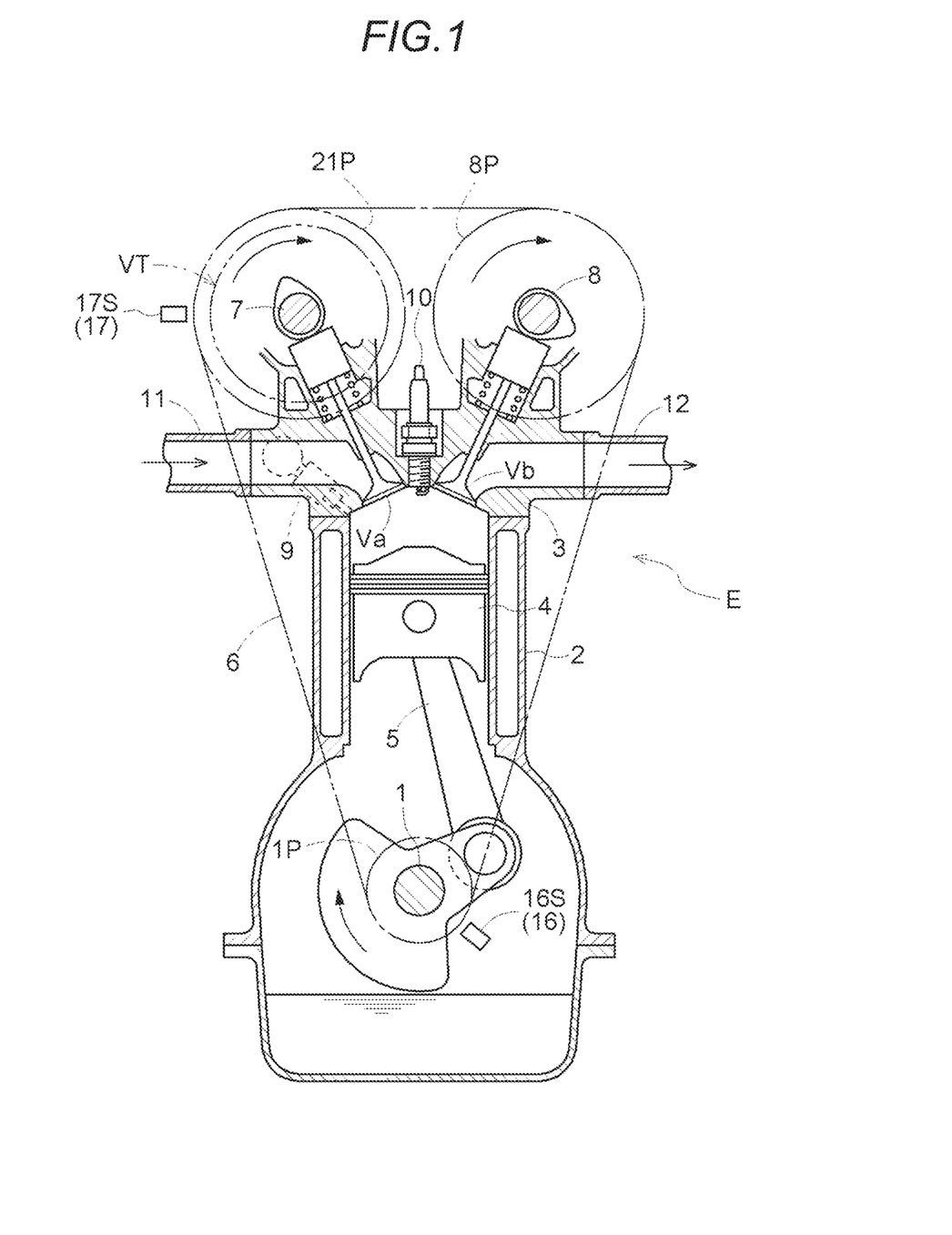
FIG. 1 is a sectional view of an engine.
Figure 2:
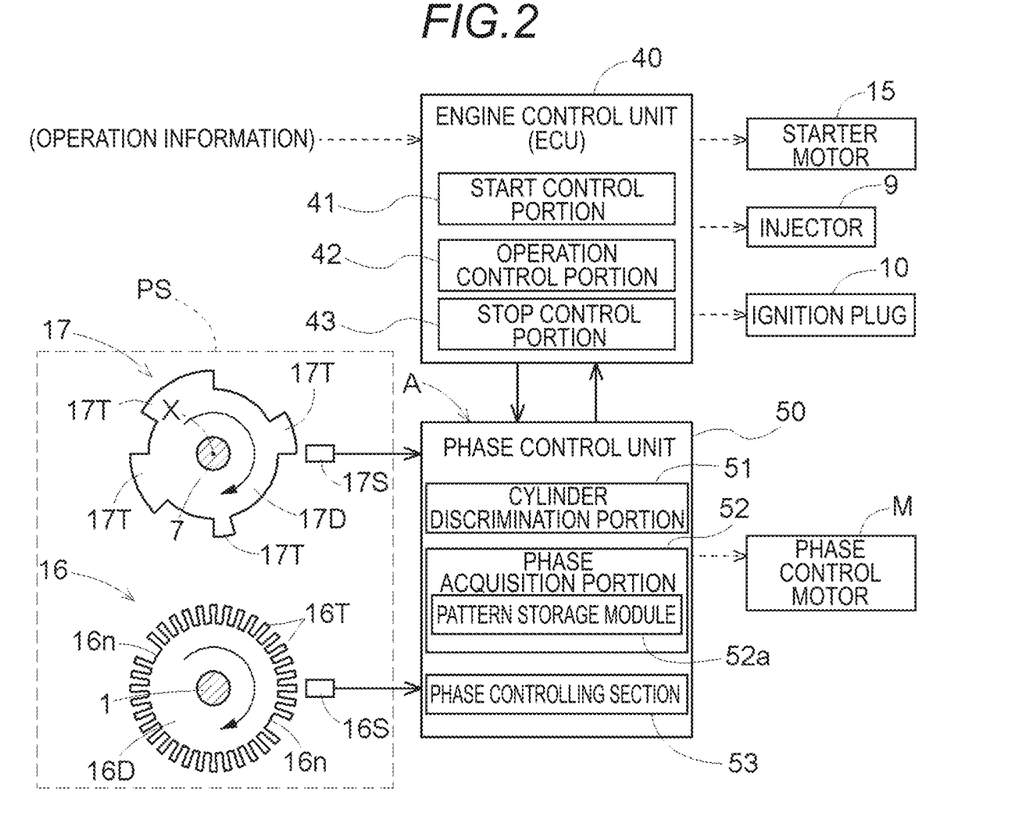
FIG. 2 is a block diagram of an engine control unit and a phase control unit.

FIG. 1 illustrates an engine E as an internal combustion engine, and FIG. 2 illustrates an engine control unit 40 for controlling the engine E and a phase control unit 50 for controlling the phase of a valve timing controller VT. As illustrated in FIGS. 1 and 2, the engine E includes the valve timing controller VT, and the valve timing controller VT sets the opening and closing timing (valve timing) of an intake valve Va of the engine E by performing phase control. In addition, the phase control unit 50 is controlled to follow control information (for example, a target phase illustrated in FIG. 10) transmitted from the engine control unit 40.

The engine E illustrated in FIG. 1 is illustrated to be provided in a vehicle, such as a passenger car. The valve timing controller VT indicates that the phase control is performed by a phase control motor M (an example of an electric motor) illustrated in FIG. 2.

When the engine E is started, cranking is performed by a starter motor 15 illustrated in FIG. 2. During the cranking, an actual phase of the valve timing controller VT is acquired by a phase sensing unit PS. The phase control unit 50 controls the valve timing controller VT such that the opening and closing timing (valve timing) of the intake valve Va becomes a value appropriate for starting the engine E by controlling the phase control motor M in a mode of feeding back the acquired actual phase.

Further, the phase control unit 50 is configured to perform cylinder discrimination based on a signal from the phase sensing unit PS, performs cylinder discrimination at the time of cranking, controls the engine control unit 40 at appropriate timing thereafter, and accordingly, fuel is supplied to a combustion chamber, and an air-fuel mixture in the combustion chamber is ignited to realize the start of the engine E.

In particular, when the engine E is started, the actual phase of the valve timing controller VT is acquired early to enable quick start. The configurations and control modes of the engine control unit 40 and the phase control unit 50 will be described later.

Engine

Figure 4:
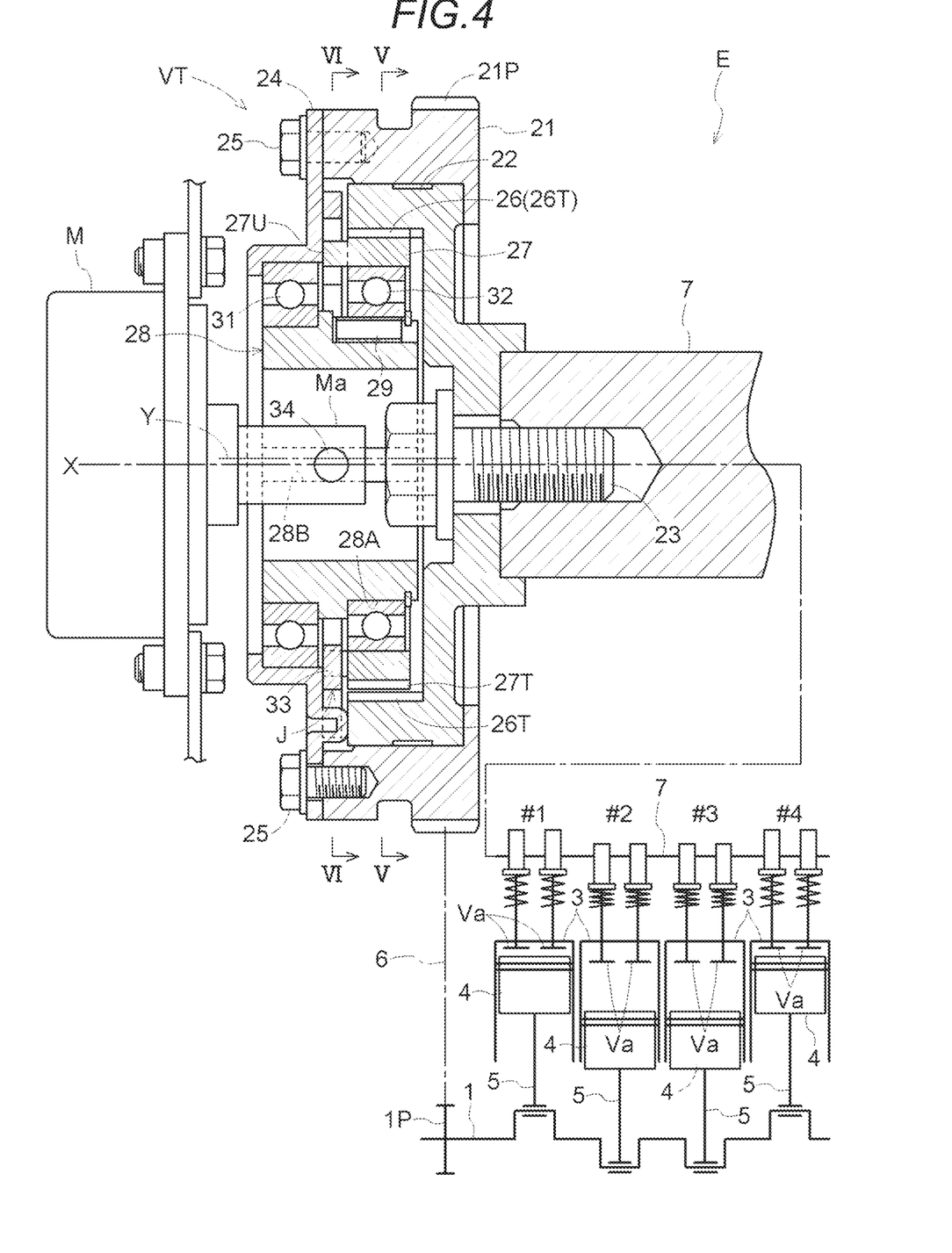
FIG. 4 is a sectional view of a valve timing controller.

In the engine E (an example of the internal combustion engine), as illustrated in FIGS. 1 and 4, a cylinder head 3 is connected to an upper portion of a cylinder block 2 which supports a crankshaft 1, a piston 4 is slidably accommodated in a plurality of cylinder bores formed in the cylinder block 2, and a piston 4 is connected to the crankshaft 1 by a connecting rod 5 to form a four-cycle type.

In the engine E, a cylinder #1, a cylinder #2, a cylinder #3, and a cylinder #4 (illustrated as #1, #2, #3, and #4 in FIG. 4) from one end portion to the other end portion are disposed, and the combustion chamber is formed between the piston 4 and the cylinder head 3 in an internal space of the cylinder.

The cylinder head 3 is provided with an intake valve Va and an exhaust valve Vb, and an intake cam shaft 7 that controls the intake valve Va and an exhaust cam shaft 8 that controls the exhaust valve Vb are provided in the upper portion of the cylinder head 3.

A timing belt 6 is wound around an output pulley portion 1P of the crankshaft 1, a timing pulley portion 21P of a driving case 21 (an example of the driving side rotation member) of the valve timing controller VT, and a driving pulley portion 8P of the exhaust cam shaft 8. Accordingly, the crankshaft 1 and the driving case 21 synchronously rotate.

The cylinder head 3 includes an injector 9 for injecting the fuel into the combustion chamber and an ignition plug 10. An intake manifold 11 for supplying air to the combustion chamber via the intake valve Va and an exhaust manifold 12 for sending out the combustion gas from the combustion chamber via the exhaust valve Vb are connected to the cylinder head 3.

In the engine E, as illustrated in FIG. 2, the starter motor 15 for driving and rotating the crankshaft 1 is provided, and as illustrated in FIG. 1, a crank angle sensor 16 that can detect the rotational speed (rotation number per unit time) of the crankshaft 1 is provided at a position in the vicinity of the crankshaft 1. Further, a cam angle sensor 17 that can detect the rotation phase of the intake cam shaft 7 is provided. The crank angle sensor 16 and the cam angle sensor 17 configure the phase sensing unit PS. Furthermore, the crank angle sensor 16 also functions as a reference determination sensor.

As will be described later, the phase sensing unit PS acquires a relative rotation phase (the above-described actual phase) around a rotation axis X of the driving case 21 and an internal rotor 22 of the valve timing controller VT, and inputs a signal for realizing cylinder discrimination to the phase control unit 50.

Valve Timing Controller

As illustrated in FIGS. 4 to 7, the valve timing controller VT includes a phase regulating mechanism that has the driving case 21 (an example of a driving side rotation member) and the internal rotor 22 (an example of a driven side rotation member), and sets relative rotation phases of the driving case 21 and the internal rotor 22. The phase regulating mechanism is configured as a gear decelerating mechanism that sets the relative rotation phase by driving the phase control motor M (an example of an electric motor).

The driving case 21 has the timing pulley portion 21P formed at an outer periphery, and is disposed on the same axis as the rotation axis X of the intake cam shaft 7. The internal rotor 22 is rotatably contained relative to the driving case 21 and is connected and fixed to the driving case 21 with the same axis as the intake cam shaft 7 by a connecting bolt 23. The phase regulating mechanism is disposed between the driving case 21 and the internal rotor 22, a front plate 24 that holds the position regulating mechanism is disposed at a position that covers an opening part of the driving case 21, and the front plate 24 is fastened to the driving case 21 by a plurality of fastening bolts 25.

Figure 5:
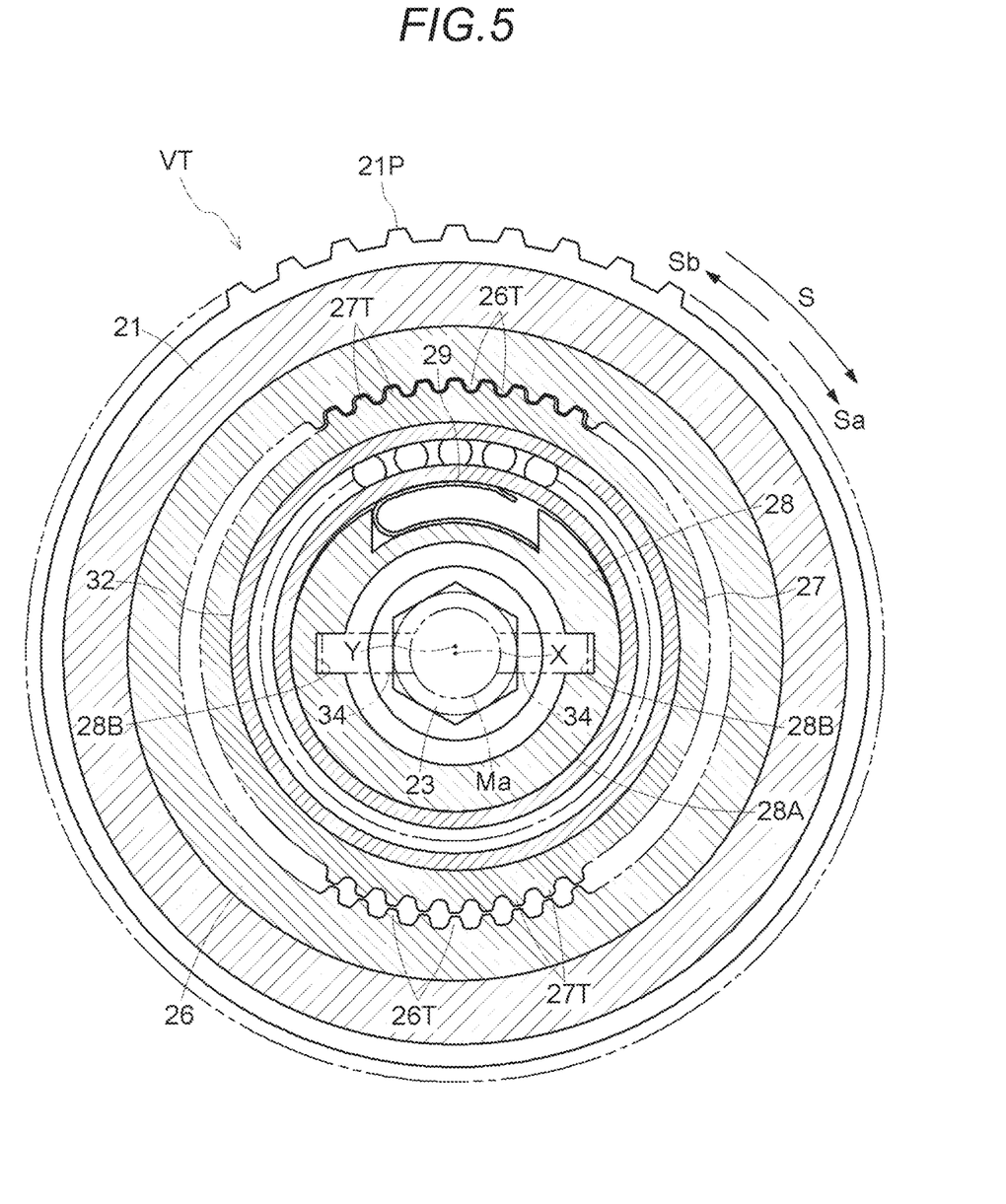
FIG. 5 is a sectional view taken along line V-V in FIG. 4.
Figure 6:
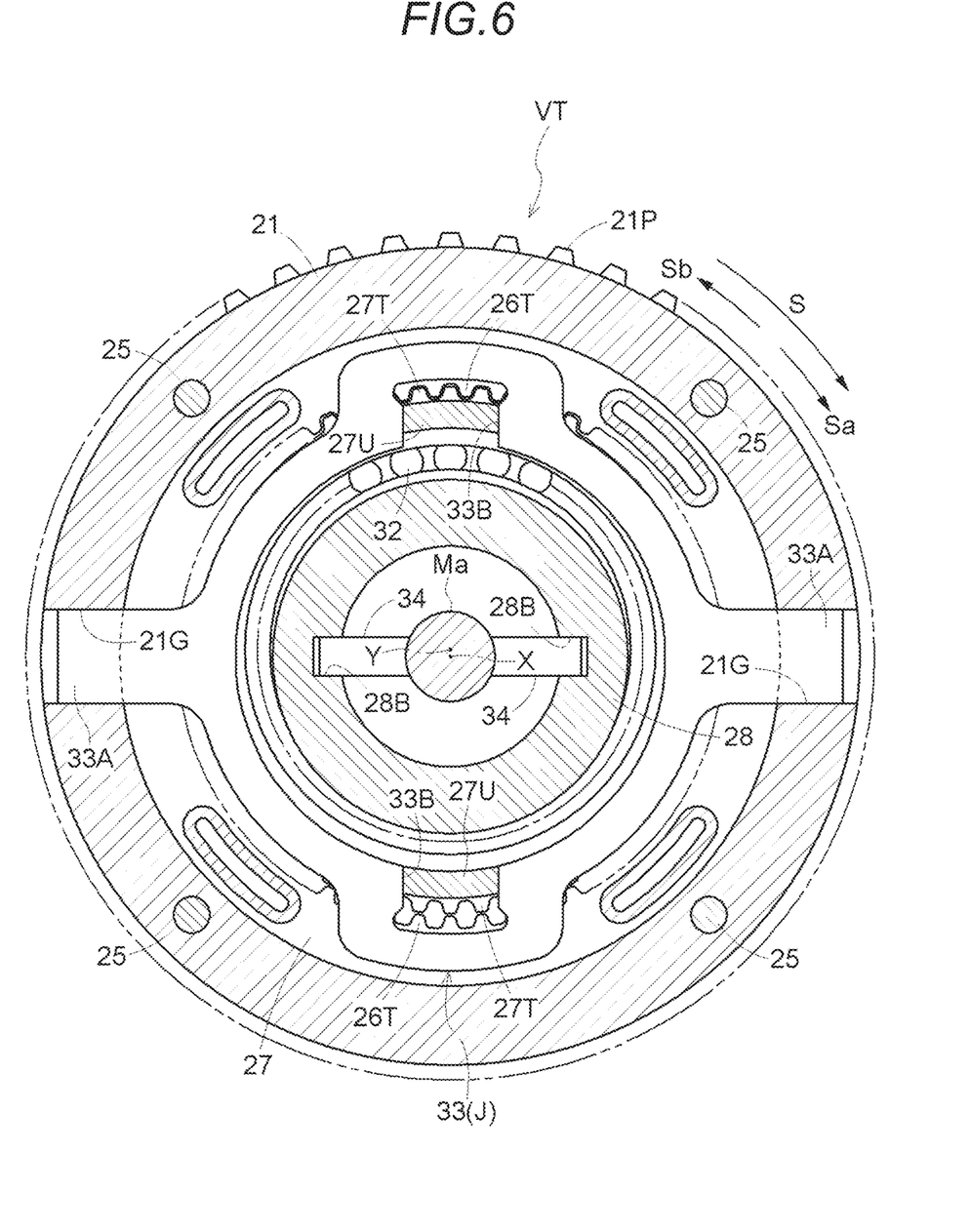
FIG. 6 is a sectional view taken along line VI-VI in FIG. 4.
Figure 7:
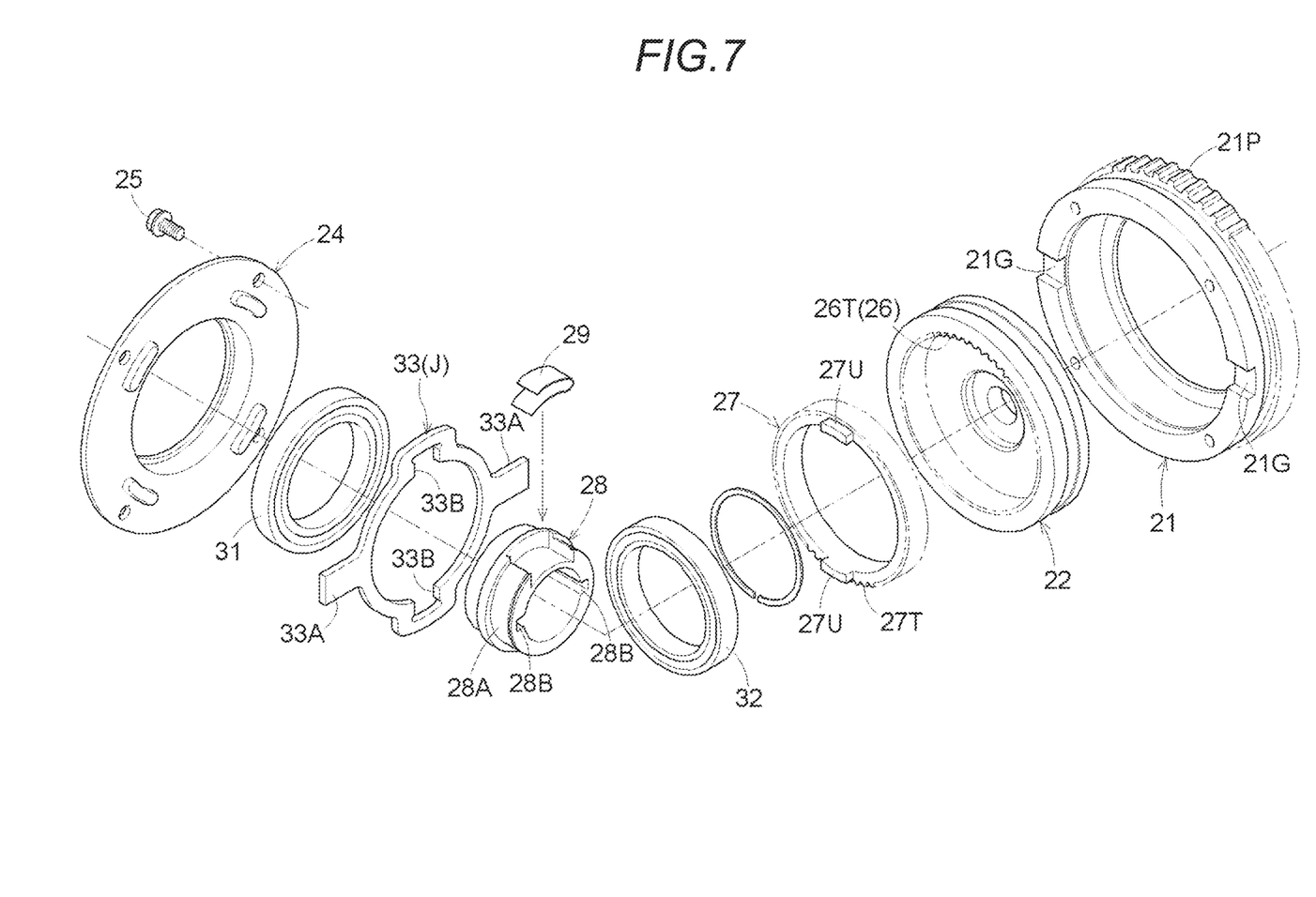
FIG. 7 is an exploded perspective view of the valve timing controller.

As illustrated in FIG. 5, the entire valve timing controller VT is rotated in a driving rotational direction S by a driving force from the timing belt 6. A direction in which the relative rotation phase of the internal rotor 22 with respect to the driving case 21 by the driving force of the phase control motor M is displaced in a direction the same as the driving rotational direction S is referred to as an advancing direction Sa, and a direction of displacement in a direction opposite to the advancing direction Sa is referred to as a retarding direction Sb.

Furthermore, the valve timing controller VT functions so as to increase an intake air amount in the intake valve Va by displacing the relative rotation phase in the advancing direction Sa, and conversely decrease the intake air amount in the intake valve Va by displacing the relative rotation phase in the retarding direction Sb.

Valve Timing Controller: Phase Regulating Mechanism

As illustrated in FIGS. 4 to 7, the phase regulating mechanism includes a ring gear 26 formed at an inner periphery of the internal rotor 22, an inner gear 27, an eccentric cam body 28, and a joint portion J. The ring gear 26 has a plurality of internal tooth portions 26T around the rotation axis X formed at the inner periphery of the internal rotor 22. The inner gear 27 has a plurality of external tooth portions 27T formed at the outer periphery. The inner gear 27 is disposed on the same axis as an eccentric axis Y in a posture parallel to the rotation axis X, and with this disposition, some of the external tooth portions 27T are interlocked with some of the internal tooth portions 26T of the ring gear 26.

In the phase regulating mechanism, the number of teeth of the external tooth portions 27T of the inner gear 27 is smaller than the number of teeth of the internal tooth portions 26T of the ring gear 26 by one.

In addition, the joint portion J is configured as an Oldham's coupling that prevents relative rotation between the driving case 21 and the inner gear 27 while permitting the displacement of the inner gear 27 in a direction orthogonal to the rotation axis X with respect to the driving case 21.

The eccentric cam body 28 is supported by a first bearing 31 with respect to the front plate 24 so as to rotate on the same axis as the rotation axis X. In the eccentric cam body 28, an eccentric cam face 28A around the eccentric axis Y having a posture parallel to the rotation axis X is integrally formed and the inner gear 27 is rotatably supported via a second bearing 32 with respect to the eccentric cam face 28A. Furthermore, a spring body 29 is fitted into a recess portion formed on the eccentric cam face 28A, and a biasing force of the spring body 29 is caused to act on the inner gear 27 via the second bearing 32.

The entire eccentric cam body 28 is cylindrical, and a pair of engaging grooves 28B is formed at the inner periphery in a posture parallel to the rotation axis X.

Accordingly, some of the external tooth portions 27T of the inner gear 27 are interlocked with some of the internal tooth portions 26T of the ring gear 26. Furthermore, although the first bearing 31 and the second bearing 32 are configured with ball bearings, the bearings may be configured with bushes.

The joint portion J has a joint member 33 formed by pressing a plate material. In the joint member 33, a center part is formed in an annular shape, a pair of engaging arms 33A is formed to protrude outward from the annular center part, and a pair of engagement recess portions 33B is formed to be connected to a space of the annular center part. Further, the pair of engaging arms 33A of the joint member 33 is engaged with an engaging groove portion 21G of the driving case 21, and the pair of engagement recess portions 33B formed in the joint member 33 is engaged with an engagement protrusion portion 27U of the inner gear 27.

In the joint portion J, the joint member 33 is engaged to be displaceable in a linear direction in which the pair of engaging groove portions 21G of the driving case 21 is connected to each other, and the inner gear 27 is engaged with the joint member 33 to be displaceable in the linear direction in which the pair of engagement protrusion portions 27U is connected to each other.

The phase control motor M is a brushless DC motor and is supported by the engine E. An output shaft Ma of the phase control motor M is provided with an engagement pin 34 in a posture perpendicular to a protruding direction of the output shaft Ma, and both ends of the engagement pin 34 are fitted in the engaging groove 28B at the inner periphery of the eccentric cam body 28. Accordingly, the eccentric cam body 28 is rotated by the driving force of the phase control motor M.

Regarding the valve timing controller VT, considering an operation mode in a state where the engine E is stopped, in a case where the eccentric cam body 28 is rotated by the driving force of the phase control motor M, the eccentric cam face 28A rotates around the rotation axis X, and according to the rotation, the inner gear 27 starts to revolve around the rotation axis X. At the time of the revolution, since the interlock position between the external tooth portions 27T of the inner gear 27 and the internal tooth portions 26T of the ring gear 26 is displaced along the inner periphery of the ring gear 26, a force that makes rotation around the eccentric axis Y acts on the inner gear 27.

In addition, at the time when the inner gear 27 revolves by one rotation, a rotating force acts to rotate the inner gear 27 only by an angle (an angle that corresponds to one tooth) that corresponds to a difference (difference in number of teeth) between the number of teeth of the internal tooth portions 26T of the ring gear 26 and the number of teeth of the external tooth portions 27T of the inner gear 27.

As described above, since the joint portion J regulates the rotation of the inner gear 27 with respect to the driving case 21, the inner gear 27 does not rotate with respect to the driving case 21 even when the eccentric cam body 28 rotates by the driving force of the phase control motor M, and the ring gear 26 rotates with respect to the driving case 21 by the rotating force that acts on the inner gear 27, the internal rotor 22 relatively rotates integrally with the ring gear 26, and as a result, regulation of the rotation phase of the intake cam shaft 7 with respect to the driving case 21 is realized.

In particular, in a case where the inner gear 27 revolves only by one rotation around the rotation axis X, the phase regulating mechanism is configured such that the intake cam shaft 7 is rotated with respect to the driving case 21 only by the angle that corresponds to the difference (difference in number of teeth) from the number of teeth of the external tooth portions 27T of the inner gear 27, and thus, regulation at a large deceleration ratio is realized.

Overview of Phase Regulation

As described above, since the phase regulating mechanism is configured, in the valve timing controller VT, by driving and rotating the output shaft Ma of the phase control motor M in the same direction at the same speed as the rotational speed of the intake cam shaft 7, a state where the eccentric cam body 28 and the inner gear 27 do not relatively rotate is maintained, and the relative rotation phase of the driving case 21 and the internal rotor 22 is maintained.

In addition, it becomes possible to displace the relative rotation phase in the advancing direction Sa or in the retarding direction Sb by increasing or decreasing the rotational speed of the phase control motor M with reference to the rotational speed of the intake cam shaft 7.

Engine Control Unit

The engine control unit 40 is configured as an engine control unit (ECU) that controls the engine E, and as illustrated in FIG. 2, the engine control unit 40 inputs operation information for controlling the engine E and outputs a control signal for controlling the starter motor 15 that performs cranking, the injector 9 for supplying the fuel to the combustion chamber, and the ignition plug 10 for igniting the air-fuel mixture in the combustion chamber.

The engine control unit 40 includes a start control portion 41, an operation control portion 42, and a stop control portion 43. The start control portion 41 performs start control for starting the engine E, the operation control portion 42 performs operation control necessary for maintaining the operation of the engine E when the engine E operates, and the stop processing unit performs stop control necessary for stopping the engine E.

The start control portion 41, the operation control portion 42, and the stop control portion 43 are configured by software, but some of the portions may be configured by hardware.

Phase Control Unit

As illustrated in FIG. 2, the phase control unit 50 performs cylinder discrimination when the engine E is started, acquires the relative rotation phase (actual phase) when the crankshaft 1 rotates, and performs the phase control based on the control information from the engine control unit 40. The phase control unit 50 inputs a crank angle signal including pulse signals continuously output from the crank angle sensor 16 and a cam angle signal from the cam angle sensor 17 and outputs a control signal to the phase control motor M.

As described above, the crank angle sensor 16 and the cam angle sensor 17 configure the phase sensing portion PS. As illustrated in FIG. 2, the crank angle sensor 16 is configured to include a disk portion 16D that rotates integrally with the crankshaft 1 and a non-contact type crank sensor portion 16S that detects a plurality of tooth portions 16T of the disk portion 16D. Reference points 16n that do not include the tooth portions 16T are formed at two locations at the outer periphery of the disk portion 16D.

In the crank angle sensor 16, the disk portion 16D and the tooth portion 16T are integrally formed of a magnetic body material, such as a steel material, and a pickup type sensor is used as the crank sensor portion 16S. In addition, the pulse signals continuously detected by the crank sensor portion 16S when the crankshaft 1 rotates is referred to as a crank angle signal, and regarding the crank angle signal, the pulse signal is not output at the reference point 16n, but information that the pulse signal does not exist at the timing when the pulse signal is not output is referred to as a reference signal.

The crank angle sensor 16 functions as a reference determination sensor, and in the phase control unit 50, the rotation phase of the crankshaft 1 at the reference point 16n is referred to as a reference phase. Therefore, when the crankshaft 1 rotates, the rotation phase from a count value of the pulse signal with reference to the reference point 16n (reference signal) becomes possible. Further, the crank angle sensor 16 can acquire the rotational speed of the crankshaft 1 by counting the crank angle signal per unit time or counting the number of reference points 16n.

Figure 3:
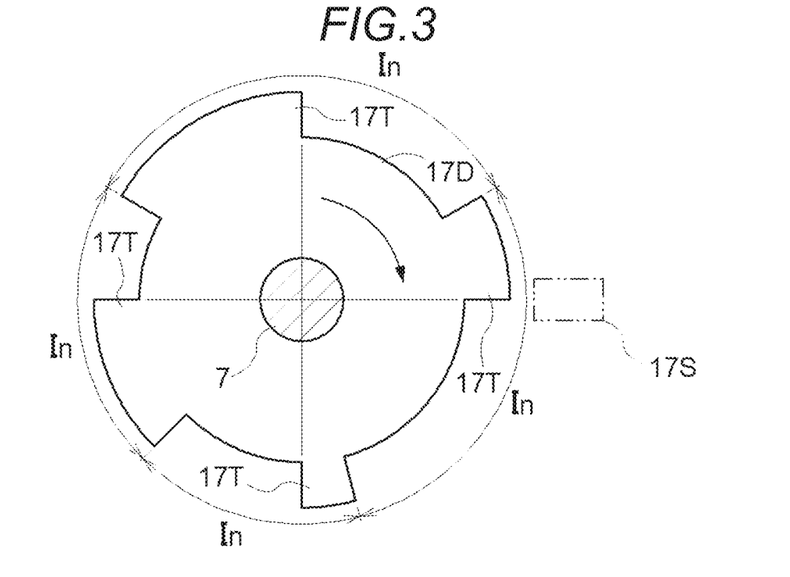
FIG. 3 is an enlarged view of a rotation member of a cam angle sensor.

As illustrated in FIGS. 2 and 3, the cam angle sensor 17 includes a rotation member 17D that rotates integrally with the intake cam shaft 7 and a cam sensor portion 17S that detects four detection regions 17T at the outer periphery of the rotation member 17D. In particular, in the cam angle sensor 17, the number of the four detection regions 17T matches the number of four cylinders of the engine E, the detection regions 17T are formed in divided regions obtained by equally dividing the entire periphery of the rotation member 17D into four, each of the peripheral lengths of the detection regions 17T are different from each other, and accordingly, it is possible to discriminate the four cylinders.

In the cam angle sensor 17, the rotation member 17D and the detection regions 17T are integrally formed of a magnetic body material, such as a steel material, and a pickup type sensor is used as the cam sensor portion 17S. A signal detected by the cam sensor portion 17S at the time of the rotation of the intake cam shaft 7 is referred to as a cam angle signal, and since the cam angle signal is output at the timing when a rear end portion in the rotational direction is detected (a down edge is detected) in the detection region 17T, four cam angle signals are output in a case where the intake cam shaft 7 rotates one time.

In the cam angle sensor 17, by starting the acquisition (integration) of the count value of the crank angle signal (refer to FIG. 10) from the crank angle sensor 16 at a timing (detection start timing Ta in FIG. 10) when the rear end portion of the detection region 17T is detected in a situation where the intake cam shaft 7 rotates, and by acquiring the count value until a timing (detection end timing Tb of FIG. 10) when the rear end portion of the next detection region 17T is detected, the discrimination of the divided regions is realized. As described above, since the peripheral lengths of the four detection regions 17T are different from each other, the acquisition timings of the four types of count values detected by the cam angle sensor 17 when the intake cam shaft 7 rotates one time are all different values. Further, as illustrated in FIG. 3, a distance In between two rear end portions is referred to as an interval In.

In particular, when the intake cam shaft 7 rotates, in the cam angle sensor 17, a relative relationship between four detection regions 17T and two reference points 16n is set such that the crank sensor portion 16S can acquire (acquire the reference signal) the reference points 16n at the timing (reference detection timing Tm of FIG. 10) from the timing (detection start timing Ta in FIG. 10) when the rear end portion of the first detection region 17T is detected by the cam sensor portion 17S and then, until the timing (detection end timing Tb of FIG. 10) when the rear end portion of the next detection region 17T is detected.

Furthermore, in order to discriminate the divided regions obtained by dividing the entire periphery of the intake cam shaft 7 into four, instead of the count value of the crank angle signal, for example, it is possible to use the count value for counting clock signals generated on the inside of the phase control unit 50. In addition, the shape of the detection region 17T in the cam angle sensor 17 or the arrangement in the peripheral direction is not limited to the shapes illustrated in FIGS. 2 and 3.

Further, the cam angle sensor 17 may be configured to detect (detect the up edge) the front end portion of the detection region 17T in the rotational direction, or may be configured to detect the front end portion (up edge) and the rear end portion (down edge) in the rotational direction in the detection region 17T.

As illustrated in FIG. 2, the phase control unit 50 includes a cylinder discrimination portion 51, a phase acquisition portion 52, and a phase controlling section 53. The cylinder discrimination portion 51 discriminates the ignition order of each cylinder when the engine E is started. The phase acquisition portion 52 includes a pattern storage module 52a (an example of a pattern storage unit), and acquires the relative rotation phase (actual phase) of the valve timing controller VT. The phase controlling section 53 controls the relative rotation phase by controlling the rotational speed of the phase control motor M.

Furthermore, the cylinder discrimination portion 51, the phase acquisition portion 52, and the phase controlling section 53 are configured by software, but some of the portions may be configured by hardware.

The cylinder discrimination portion 51 acquires the rotation phase of the intake cam shaft 7 from the interval between two cam angle signals continuously acquired being continuous by the cam angle sensor 17 when the engine E is started, and based on the rotation phase and a rotation phase of the crankshaft 1 acquired from the count value obtained by counting the cam angle signal with reference to the reference phase in the crank angle sensor 16, determines the relationship of the rotation phase of the intake cam shaft 7 with respect to the rotation phase of the crankshaft 1.

From the determination, it becomes possible to grasp the stroke (any stroke of intake, compression, combustion, or expansion) in each of the four cylinders including the cylinder #1 to the cylinder #4 with reference to the rotation phase of the crankshaft 1, and based on the rotation of crankshaft 1, it becomes possible to specify the cylinder to be ignited when performing the start control by the engine control unit 40.

The control mode of the phase acquisition portion 52 will be described later. In addition, in the phase controlling portion 53, in a case where the control signal to be a target phase is acquired from the engine control unit 40, the relative rotation phase is displaced toward the target phase by controlling the phase control motor M.

Control Mode

The phase control unit 50 acquires the crank angle signal from the crank angle sensor 16 when the engine E is started, acquires the cam angle signal from the cam angle sensor 17, acquires the actual phase (relative phase rotation phase) of the valve timing controller VT early based on the acquired signals, controls the phase control motor M in a mode of feeding back the actual phase, and accordingly, realizes the start during a short time by setting the relative rotation phase of the valve timing controller VT to a value that is optimal for starting the engine E.

Figure 8:
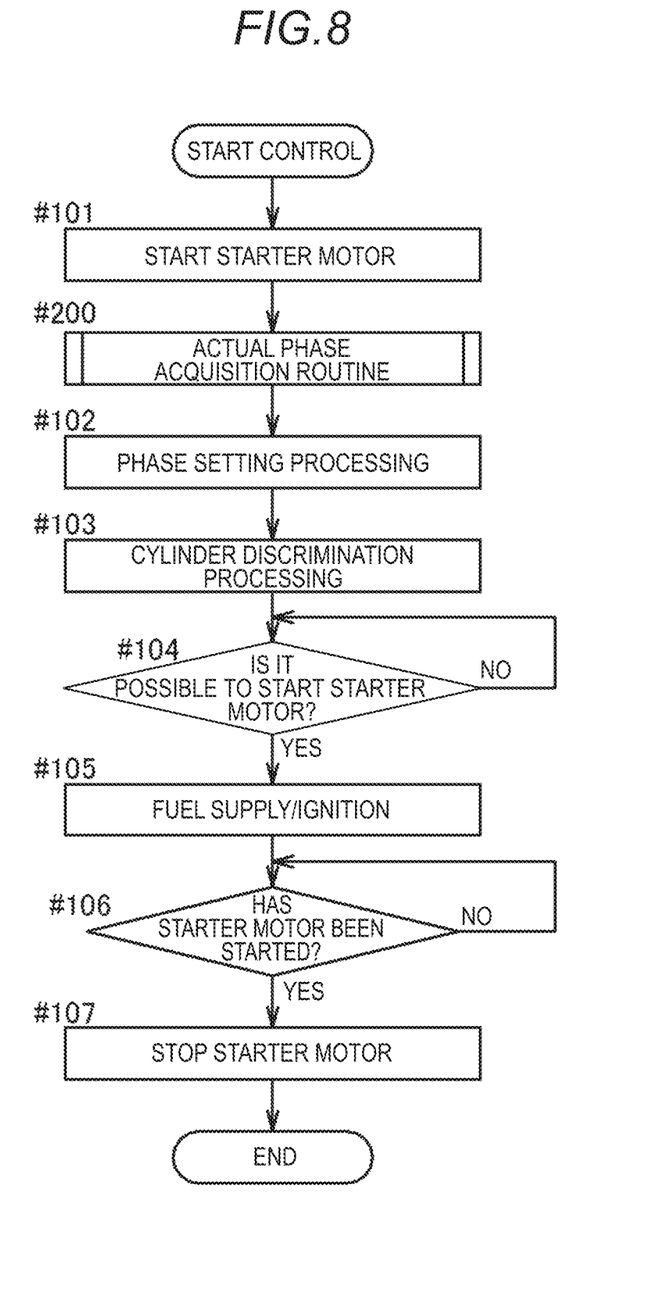
FIG. 8 is a flowchart of a start control.
Figure 9:
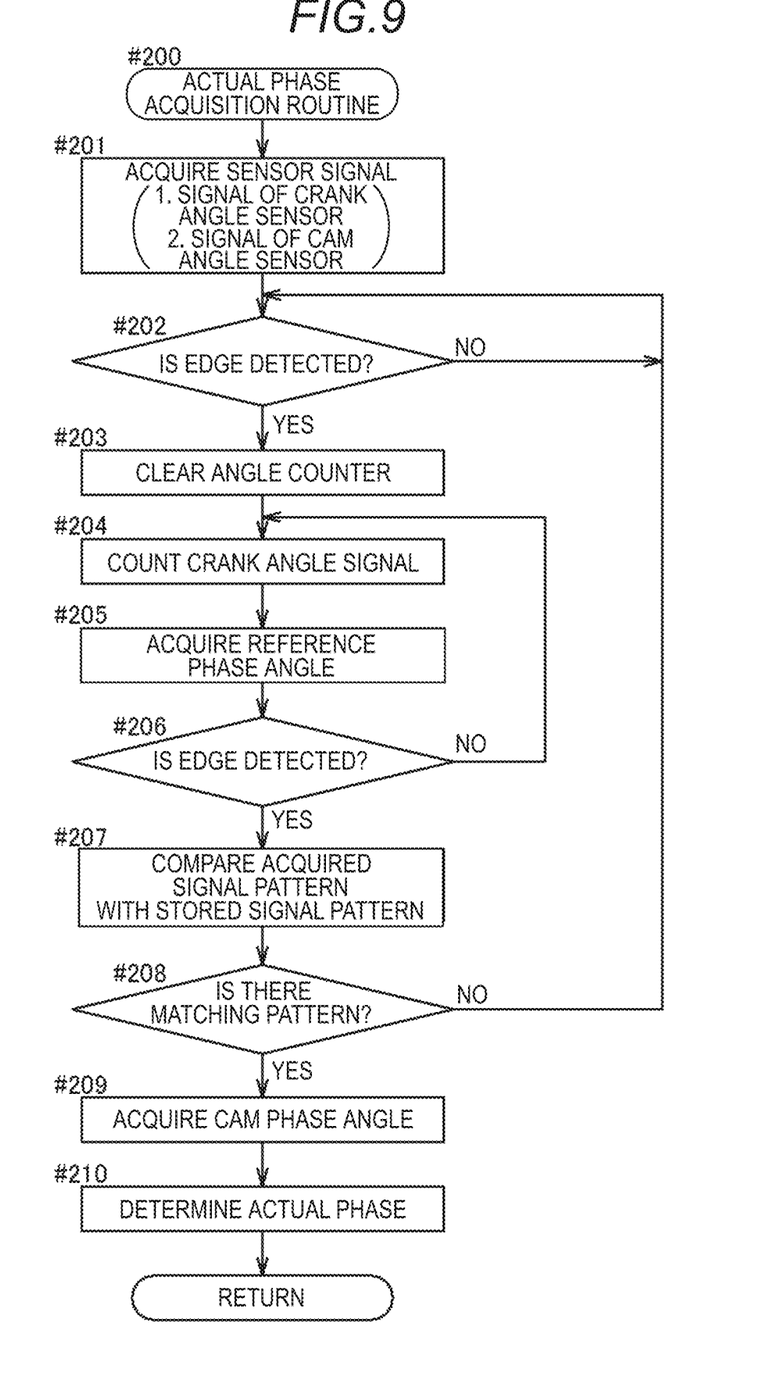
FIG. 9 is a flowchart of an actual phase acquisition routine.
Figure 10:
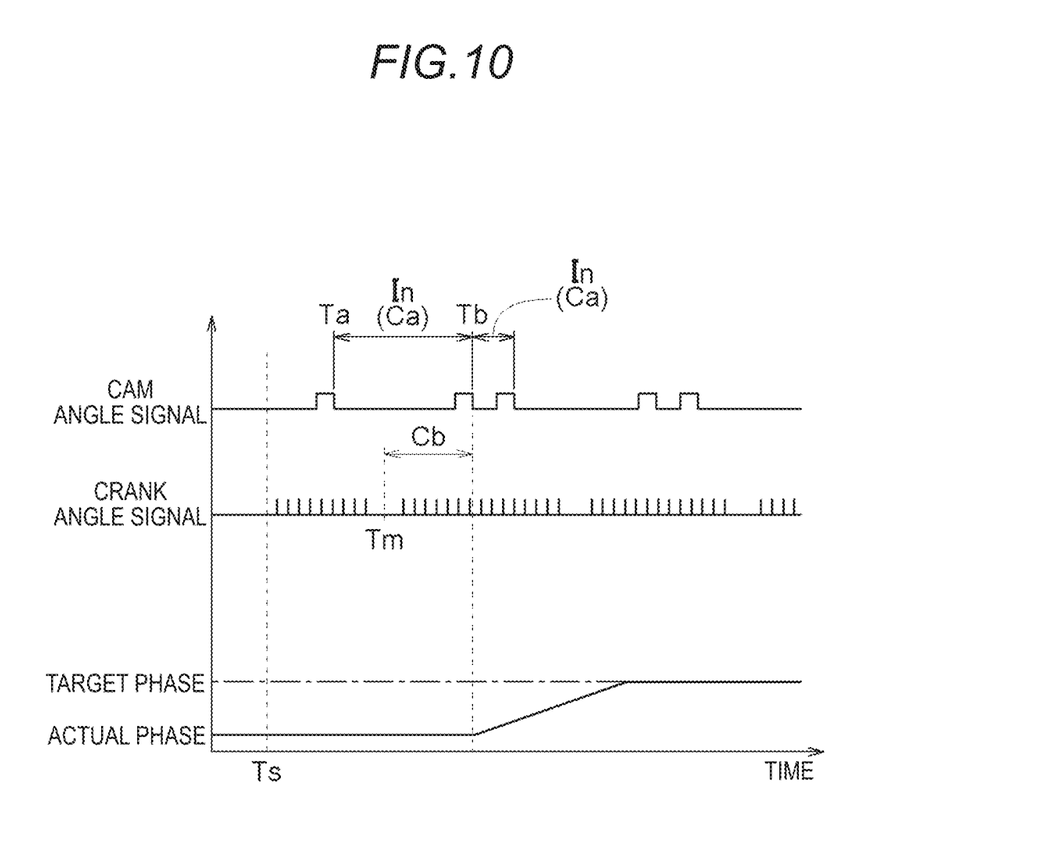

FIG. 8 illustrates a flowchart of the start control for starting the engine, FIG. 9 illustrates an actual phase acquisition routine set as a subroutine in the start control, and FIG. 10 illustrates signals and the like acquired at the start control as a timing chart. Furthermore, in the timing chart of FIG. 10, the upper part illustrates the cam angle signal acquired by the cam angle sensor 17, the middle part illustrates the crank angle signal acquired by the crank angle sensor 16, and the lower part illustrates a change in actual phase of the valve timing controller VT.

As illustrated in the flowchart of FIG. 8, when starting the engine E, the engine control unit 40 supplies power to the starter motor 15 to start cranking, and the relative rotation phase of the valve timing controller VT is acquired by the actual phase acquisition routine (steps #101 and #200).

The timing to start the cranking in the control is illustrated as a start timing Ts in FIG. 10.

After acquiring the actual phase by the actual phase acquisition routine (step #200), phase setting processing and cylinder discrimination processing are performed, and in a case where it is determined that the starting is possible based on a condition that the rotational speed of the crankshaft 1 reaches a value that enables the engine E to start, and the like, the fuel is supplied to the combustion chamber, the air-fuel mixture is ignited, and the starter motor 15 is stopped after confirming the start of the engine E (steps #102 to #107).

In the start control, at the detection end timing Tb when the actual phase (relative rotation phase) of the valve timing controller VT is acquired by the actual phase acquisition routine (step #200), by performing the control for acquiring and feeding back the actual phase in the phase controlling section 53, the phase setting processing (step #102) for displacing the relative rotation phase toward the target phase that is optimal for starting the engine E is performed. Further, by performing the cylinder discrimination processing (step #103) by the cylinder discrimination portion 51, the stroke in each of the four cylinders including the cylinder #1 to the cylinder #4 with reference to the rotation phase of the crankshaft 1 is discriminated.

After this, after the crankshaft 1 reaches a state where the start is possible, such as a state where the rotational speed exceeds a predetermined rotational speed, the start control portion 41 starts the engine E by determining a cylinder to be ignited based on the cylinder discrimination processing, supplying the fuel by the injector 9 at an appropriate timing, and performing ignition by the ignition plug 10 at an appropriate timing. In this manner, after confirming that the engine E has been started from the rotational speed of the crankshaft 1 detected by the crank angle sensor 16, the starter motor 15 is stopped.

In the actual phase acquisition routine (step #200), as illustrated in FIG. 9, processing of continuously acquiring signals from the crank angle sensor 16 and the cam angle sensor 17, clearing an angle counter at the detection start timing Ta (refer to FIG. 10) when the cam sensor portion 17S of the cam angle sensor 17 first detected the edge (down edge) of the detection region 17T, and counting (integrating) the crank angle signal by the angle counter immediately thereafter, is started. Furthermore, in a case where the reference phase is acquired by the crank angle sensor 16 in a situation where the counting continues, the count value that corresponds to the reference phase is acquired as the reference phase angle (steps #201 to #205).

The angle counter is configured with a counter circuit of the phase control unit 50 and software, and in a case where the reference phase is detected at the reference detection timing Tm in a situation where the counting continues, the count value of the detection timing is stored in a memory or the like of the phase control unit 50. In the cam angle sensor 17, the relationship between the crank angle sensor 16 and the cam angle sensor 17 is set such that the reference detection timing Tm can be acquired regardless of the relative rotation phase in the process of acquiring the four types of integrated count values Ca.

Thereafter, in a case where the cam sensor portion 17S detects the edge (down edge) of the detection region 17T (in a case where the detection end timing Tb illustrated in FIG. 10 is reached), the count value at the detection end timing Tb is acquired, the counting ends. Further, the count value acquired at the detection end timing Tb is compared with the signal pattern stored in advance in the non-volatile memory of the phase control unit 50, and in a case where there is a matching signal pattern, based on the matching signal pattern, the cam phase angle is acquired, and the actual phase is determined based on the cam phase angle and the reference phase angle (steps #206 to #210). Furthermore, in a case where there is no matching signal pattern, the processing from step #202 is executed again.

As described above, since the cam angle sensor 17 detects only rear end side edges of the four detection regions 17T, there are only four types of signal patterns that are stored, and each signal pattern is a count value that corresponds to the edge interval In illustrated in FIG. 3. Therefore, the cam sensor portion 17S acquires the cam phase angle (angle with reference to the cam sensor portion 17S or the like) from the count value (hereinafter, an integrated count value Ca illustrated in FIG. 10) at the timing when the edge (down edge) of the detection region 17T is detected at the detection end timing Tb, and compares the acquired cam phase angle with the reference phase angle.

In particular, in the control mode, the count value (integrated count value Ca) at the time when the cam sensor portion 17S detects the edge of the detection region 17T at the detection end timing Tb is set as the cam phase angle. Since the integrated count value Ca that corresponds to the cam phase angle is determined, the actual phase is determined based on the difference between the integrated count value Ca and the count value (hereinafter, referred to as the reference count value Cb: corresponding to the reference phase angle) at the reference detection timing Tm.

In the actual phase acquisition routine (step #200), the processing for acquiring two cam angle signals by the cam angle sensor 17 is required, but after the counting is started at the detection start timing Ta until the counting is ended at the detection end timing Tb (in the process of acquiring the cam phase), it is possible to acquire the count value at the reference detection timing Tm, and thus, for example, quick start of the engine E is possible by acquiring the actual phase early without waiting for the acquisition of the reference phase.

In addition, since the crank angle sensor 16 forms the reference points 16n at two locations, for example, the timing of detecting the reference phase can be made earlier compared to a case where only a single reference point 16n is formed. For this reason, the actual phase is acquired early when the engine E is started, and the relative rotation phase of the valve timing controller VT is set to a value appropriate for starting the engine to enable quick start.

Other Embodiments

The disclosure may be configured in the following manner besides the above-described embodiments (those having the same functions as those in the embodiment will be denoted by the same reference numerals as those in the embodiments).

(a) In a brushless DC motor used in the phase control motor M, a rotation detection portion (rotation angle sensor) that outputs a rotation detection signal each time the output shaft Ma reaches a predetermined phase when the output shaft Ma rotates one time is provided. In addition, in a case where the relative rotation phase of the driving case 21 and the internal rotor 22 is maintained, the output shaft Ma rotates at the same speed as the driving case 21 and the internal rotor 22 as described above, and thus, the rotation angle signal generated on the inside of the phase control motor M is also generated in synchronization with the intake cam shaft 7. Since the rotation angle signals are pulse signals continuously generated at predetermined intervals, by counting the rotation angle signal with reference to the above-described rotation detection signal, it becomes possible to use the rotation angle signal similar to the crank angle signal.

For this reason, when the engine E is started, the driving of the phase control motor M is started in synchronization with the intake cam shaft 7. In addition, after the detection start timing Ta when the edge of the detection region 17T is first detected by the cam sensor portion 17S of the cam angle sensor 17, until the next edge is detected, by counting the rotation angle signal generated on the inside of the phase control motor M, it is possible to acquire the integrated count value Ca between the detection start timing Ta and the detection end timing Tb. Since the rotation angle signal has a stable signal waveform and the number per unit time is larger than the number of crank angle signals acquired by the crank angle sensor, not only accurate counting can be performed, but also the value of the integrated count value Ca can be increased.

Therefore, in the configuration of another embodiment (a), compared to the case where the cam angle signal from the cam angle sensor 17 is counted, it becomes possible to improve the accuracy when determining the signal pattern that matches the signal pattern stored in the pattern storage module 52a.

(b) Similar to the valve timing controller VT described in the embodiment as the cam angle sensor 17, instead of a configuration in which one detection region 17T is provided for one divided region, for example, a configuration in which the plurality of tooth portions are provided in a region in which each of the detection regions 17T exist is employed.

In the configuration of another embodiment (b), in order to determine which region among the plurality of divided regions is detected by the cam sensor portion 17S, the control for counting the number of tooth portions provided in each of the divided regions is also performed in parallel with the operation of counting the crank angle signal.

(c) In the embodiment, as illustrated in FIG. 10, the reference detection timing Tm is set between the detection start timing Ta and the detection end timing Tb, but instead, a configuration in which the reference detection timing Tm is set to be later than the detection end timing Tb is employed.

In another embodiment (c), an object is to correspond to a case where the reference detection timing Tm is set between the detection start timing Ta and the detection end timing Tb (similar to FIG. 10 of the embodiment), and a case where the reference detection timing Tm is set to be later than the detection end timing Tb. In particular, in a case where the reference detection timing Tm is set to be later than the detection end timing Tb, the processing of "acquiring the reference phase angle" in step #205 of the actual phase acquisition routine (step #200) illustrated in FIG. 9 of the embodiment is performed after the processing of "detecting the edge" of step #206 and before the processing of "determining the actual phase" of step #210 in the same drawing.

In setting the processing order similar to another embodiment (c), the actual phase is acquired when the engine E is started, and the relative rotation phase of the valve timing controller VT is set to a value appropriate for starting the engine to enable quick start.

The disclosure can be used in a valve timing controller which sets the relative rotation phase of the cam shaft for opening and closing the valve of the internal combustion engine.

A feature of a valve timing controller according to an aspect of this disclosure resides in that the valve timing controller includes: a driving side rotation member that rotates synchronously with a crankshaft of an internal combustion engine; a driven side rotation member that integrally rotates with a cam shaft for valve opening and closing of the internal combustion engine; a phase regulating mechanism with which a relative rotation phase of the driving side rotation member and the driven side rotation member around a rotation axis is set by a driving force of an electric motor; a phase sensing portion that acquires the relative rotation phase; and a phase controlling section that controls the electric motor to set the relative rotation phase based on an acquisition result by the phase sensing portion, in which the phase sensing portion includes a cam angle sensor that acquires a plurality of cam angle signals at different intervals when the cam shaft rotates one time, a reference determination sensor that acquires a reference signal at a specified rotation phase when the crankshaft rotates one time, and a pattern storage unit that stores signal patterns of the continuously acquired cam angle signals, and in which the valve timing controller further includes a phase acquisition portion that continuously acquires the cam angle signals at the time of cranking, specifies a pattern that matches the continuously acquired cam angle signals among the signal patterns stored in the pattern storage unit, and acquires the relative rotation phase based on a cam phase angle indicated by the specified signal pattern and a reference phase angle indicated by the reference signal.

In the feature configuration, for example, in a case where the cranking is started when the internal combustion engine is started, the reference signal is acquired at a specific reference phase angle when the crankshaft rotates one time. In addition, as the cam shaft rotates, the cam angle signals are continuously acquired by the cam angle sensor, and among the signal patterns stored in the pattern storage unit, the signal pattern that matches the acquired cam angle signal is specified. Based on the cam phase angle indicated by the signal pattern specified in this manner and the reference phase angle, the phase acquisition unit can acquire the relative rotation phase of the driving side rotation member and the driven side rotation member.

In particular, in this configuration, for example, since it is possible to acquire the reference signal in the process of acquiring two cam angle signals, for example, it also becomes possible to compare the reference signal with the acquired signal after acquiring the two cam angle signals, and to make the timing of acquiring the relative rotation phase early. Therefore, a valve timing controller that can acquire the actual valve opening and closing timing early when the internal combustion engine is started, is configured.

As another configuration, the phase regulating mechanism may include a gear decelerating mechanism that relatively rotates the driving side rotation member and the driven side rotation member, and may be configured such that the electric motor transmits the driving force to the gear decelerating mechanism by an output shaft disposed on the same axis as the rotation axis, the relative rotation phase is maintained by driving the output shaft of the electric motor at a speed equivalent to a rotational speed of the cam shaft when the cam shaft rotates, and displacement of the relative rotation phase is performed by increasing or decreasing a rotational speed of the output shaft compared to the rotational speed of the cam shaft, the electric motor may be configured to be driven such that the output shaft rotates by rotation angle signals continuously generated at predetermined intervals, and to output a detection signal each time when reaching a predetermined rotation phase when the output shaft rotates one time, when the crankshaft rotates, in a case where the cam angle signals are continuously acquired, the phase acquisition unit may acquire an interval between the cam angle signal acquired previously and the cam angle signal acquired later based on a count value obtained by counting the rotation angle signals, and the pattern storage unit may store a plurality of the count values as a plurality of the signal patterns.

In this configuration, when the first cam angle signal is acquired, counting of the rotation angle signal for driving the electric motor is started, the count value of the rotation angle signal at the time of acquiring the next cam angle signal is acquired, and accordingly, it becomes possible for the count value to be the interval between two continuous cam angle signals. In addition, since the plurality of count values are stored as the signal pattern in the pattern storage unit, it becomes possible to specify the signal pattern by simply comparing the count values, and it also becomes possible to improve accuracy.

As still another configuration, the crankshaft may include a crank angle sensor that continuously acquires pulse signals in a region excluding the reference phase angle when the crankshaft rotates one time, and the crank angle sensor may be used in the reference determination sensor such that a phase angle from which the pulse signal is not acquired becomes the reference phase angle.

With this configuration, it becomes possible to acquire the rotational speed (rotation number per unit time) of the crankshaft by counting the pulse signal acquired by the crank angle sensor, and it becomes possible to set the phase angle from which the pulse signal is not capable of being acquired as the reference phase angle when the crankshaft rotates one time. Therefore, it becomes possible to acquire the reference phase angle by the crank angle sensor, and to acquire the relative rotation phase.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A valve timing controller comprising:
a driving side rotation member that rotates synchronously with a crankshaft of an internal combustion engine;
a driven side rotation member that integrally rotates with a cam shaft for valve opening and closing of the internal combustion engine;
a phase regulating mechanism with which a relative rotation phase of the driving side rotation member and the driven side rotation member around a rotation axis is set by a driving force of an electric motor;

a phase sensing portion that acquires the relative rotation phase; and a phase controlling section that controls the electric motor to set the relative rotation phase based on an acquisition result by the phase sensing portion, wherein the phase sensing portion includes
- a cam angle sensor that acquires a plurality of cam angle signals at different intervals when the cam shaft rotates one time,
- a reference determination sensor that acquires a reference signal at a specified rotation phase when the crankshaft rotates one time, and
- a pattern storage unit that stores signal patterns of the continuously acquired cam angle signals, the valve timing controller further comprises a phase acquisition portion that continuously acquires the cam angle signals at the time of cranking, specifies a pattern that matches the continuously acquired cam angle signals among the signal patterns stored in the pattern storage unit, and acquires the relative rotation phase based on a cam phase angle indicated by the specified signal pattern and a reference phase angle indicated by the reference signal, the phase regulating mechanism includes a gear decelerating mechanism that relatively rotates the driving side rotation member and the driven side rotation member, and is configured such that the electric motor transmits the driving force to the gear decelerating mechanism by an output shaft disposed on the same axis as the rotation axis, the relative rotation phase is maintained by driving the output shaft of the electric motor at a speed equivalent to a rotational speed of the cam shaft when the cam shaft rotates, and displacement of the relative rotation phase is performed by increasing or decreasing a rotational speed of the output shaft compared to the rotational speed of the cam shaft, the electric motor is configured to be driven such that the output shaft rotates by rotation angle signals continuously generated at predetermined intervals, and to output a detection signal each time when reaching a predetermined rotation phase when the output shaft rotates one time, when the crankshaft rotates, in a case where the cam angle signals are continuously acquired, the phase acquisition portion acquires an interval between the cam angle signal acquired previously and the cam angle signal acquired later based on a count value obtained by counting the rotation angle signals, and the pattern storage unit stores a plurality of the count values as a plurality of the signal patterns.

2. The valve timing controller according to claim 1, wherein
the crankshaft includes a crank angle sensor that continuously acquires pulse signals in a region excluding the reference phase angle when the crankshaft rotates one time, and the crank angle sensor is used in the reference determination sensor such that a phase angle from which the pulse signal is not acquired becomes the reference phase angle.

* * * * *